United States Patent
Nihei

(10) Patent No.: US 8,301,594 B2
(45) Date of Patent: Oct. 30, 2012

(54) CONTEXT PROVIDING METHOD, SYSTEM, AND APPARATUS

(75) Inventor: Katsumi Nihei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/076,838

(22) Filed: Mar. 24, 2008

(65) Prior Publication Data

US 2008/0250117 A1    Oct. 9, 2008

Related U.S. Application Data

(63) Continuation of application No. 11/091,694, filed on Mar. 29, 2005, now abandoned.

(30) Foreign Application Priority Data

Mar. 31, 2004 (JP) ................................. 2004-104630

(51) Int. Cl.
*G06F 17/30* (2006.01)
(52) U.S. Cl. ...................................................... 707/621
(58) Field of Classification Search .................. 342/451; 340/10.3, 988, 10.1, 572.7, 581.1; 707/203, 707/2, 6, 621, 620; 709/223; 701/36, 214; 455/414.1; 77/620
See application file for complete search history.

(56) References Cited

U.S. PATENT DOCUMENTS

| | | | | |
|---|---|---|---|---|
| 5,045,860 A | * | 9/1991 | Hodson | .......................... 342/451 |
| 5,893,122 A | | 4/1999 | Tabuchi | |
| 6,677,852 B1 | * | 1/2004 | Landt | ........................... 340/10.1 |
| 6,882,276 B2 | * | 4/2005 | Zukowski et al. | ......... 340/568.8 |
| 6,883,019 B1 | | 4/2005 | Sengupta et al. | |
| 7,053,831 B2 | * | 5/2006 | Dempsey et al. | ............. 342/463 |
| 7,058,710 B2 | | 6/2006 | McCall et al. | |
| 7,504,949 B1 | * | 3/2009 | Rouaix et al. | .............. 340/572.1 |
| 2002/0089434 A1 | * | 7/2002 | Ghazarian | ...................... 340/988 |
| 2003/0191568 A1 | * | 10/2003 | Breed | .............................. 701/36 |
| 2005/0003804 A1 | | 1/2005 | Huomo et al. | |
| 2005/0143916 A1 | * | 6/2005 | Kim et al. | ...................... 701/214 |
| 2005/0273291 A1 | | 12/2005 | Zukowski et al. | |
| 2006/0044112 A1 | * | 3/2006 | Bridgelall | ..................... 340/10.1 |
| 2006/0168185 A1 | | 7/2006 | McCall et al. | |

FOREIGN PATENT DOCUMENTS

| | | |
|---|---|---|
| JP | 9-153067 | 6/1997 |
| JP | 2000-47980 A | 2/2000 |
| JP | 2001216315 A | 8/2001 |
| JP | 2004-507805 A | 3/2004 |

OTHER PUBLICATIONS

Institute of Electronics, Information and Communication Engineers, IEICE Technical Report, Mar. 7, 2003, 12 pages, vol. 102, No. 694.

* cited by examiner

*Primary Examiner* — Sherief Badawi
(74) *Attorney, Agent, or Firm* — Foley & Lardner LLP

(57) ABSTRACT

A context providing method includes the collection step of collecting context information representing a situation of a target via a network, the generation step of applying a predetermined rule to the collected context information and information associated with a context entity which generates/utilizes the context information, thereby generating new context information, and the step of transmitting the generated context information to a context requester via the network. A context providing system and apparatus are also disclosed.

20 Claims, 6 Drawing Sheets

```
INFORMATION ACQUISITION ( )
if (TARGET CONTEXT ENTITY HAS TARGET CONTEXT INFORMATION)
        TARGET CONTEXT INFORMATION POSITION OF TARGET CONTEXT ENTITY IS RESULT.

else
    for (FOR ALL CONTEXT INFORMATION)
        if (CONTEXT INFORMATION IS LINK INFORMATION.)
            EXECUTE INFORMATION ACQUISITION ( ) FOR CONTEXT ENTITY OF LINK DESTINATION.
            if (TARGET CONTEXT INFORMATION IS OBTAINED )
                    TARGET CONTEXT INFORMATION OF LINK DESTINATION IS RESULT.
            end if
        end if
    end for
    TARGET CONTEXT INFORMATION ACQUISITION HAS FAILED.
end if
```

```
BEST POSITION INFORMATION ACQUISITION ( )

begin
        EXECUTE POSITION INFORMATION ACQUISITION FOR TARGET CONTEXT ENTITY
        if POSITION INFORMATION CONTEXT CANDIDATE COUNT = 0
                POSITION INFORMATION ACQUISITION HAS FAILED.
        else
                POSITION INFORMATION CONTEXT CANDIDATE HAVING MINIMUM ERROR VALUE IS
                SELECTED FROM POSITION INFORMATION CONTEXT CANDIDATE COUNT AND
                DEFINE IT AS POSITION INFORMATION
        end if
end

POSITION INFORMATION ACQUISITION ( )

begin
        if (POSITION CONTEXT INFORMATION IS PRESENT IN CONTEXT)
                THIS POSITION CONTEXT INFORMATION IS ADDED TO POSITION CONTEXT CANDIDATE.
        end if
        for (FOR ALL CONTEXT INFORMATION)
                if (CONTEXT INFORMATION IS LINK INFORMATION.)
                        EXECUTE POSITION INFORMATION ACQUISITION ( )
                        FOR CONTEXT ENTITY AS LINK DESTINATION.
                end if
        end if
end
```

CONTEXT PROVIDING METHOD, SYSTEM, AND APPARATUS

This application is a continuation of U.S. patent application Ser. No. 11/091,694, filed Mar. 29, 2005, which claims priority to Japanese Application No. 2004-104630, filed Mar. 31, 2004, the disclosures of which are hereby incorporated by reference in their entirety.

BACKGROUND OF THE INVENTION

The present invention relates to a context providing method, system, and apparatus for acquiring or generating a context satisfying a request representing the context representing a situation for a user, article, environment, or the like, and sending a context notification.

Conventionally, a computer system has been proposed, which generates context information representing a context requested from an application and transferring the context information to the application via a network. Japanese Patent Laid-Open No. 2001-216315 (reference 1) discloses the following method of generating and providing context information having a high degree of satisfaction for a user.

(1) At least one context data unit information made up of identification information of one context data used for generating context information and at least one attribute information for designating a feature of the context data is made to correspond to identification information of the context information and registered in an information-data unit correspondence table in advance, (2) the context data unit information is made to correspond to a context data source suitable for acquiring context data identified by the identification information of the context data unit information and registered in a data unit-source correspondence table, (3) at least one context data unit information having context data of a feature suitable for generating context information associated with a management target requested from an application is specified by looking up the information-data unit correspondence table, (4) a context data source suitable for acquiring context data identified by the identification information of the specified context data unit information is specified by looking up the data unit-source correspondence table, and (5) context data is acquired from the specified context data source, and context information requested from the application is generated using the acquired context data and output.

The conventional context providing method described above can be summarized as follows. An attribute for a context source required for generating the requested context information is determined using the information-data unit correspondence table. A context source having the determined attribute is determined using the data unit-source correspondence table to generate and provide the context information.

The conventional context providing method, however, determines the context source from the requested context information through the context source attribute. For example, an automobile has a GPS (Global Positioning System) as a context source, and an automobile position is defined as a context. In addition, another context that a user gets in this automobile is present. In this case, a context as the user's position cannot be generated from the above two contexts.

In the conventional case, a new context cannot be disadvantageously generated from a combination of a plurality of contexts, as described above.

SUMMARY OF THE INVENTION

It is an object of the present invention to allow generation of a context using a context from a context source which is not directly relevant to a context entity which wants to grasp the context.

In order to achieve the above object of the present invention, there is provided a context providing method comprising the collection step of collecting context information representing a situation of a target via a network, the generation step of applying a predetermined rule to the collected context information and information associated with a context entity which generates/utilizes the context information, thereby generating new context information, and the step of transmitting the generated context information to a context requester via the network.

BRIEF DESCRIPTION OF THE DRAWINGS

FIG. 4 is a view for explaining a context generation sequence by a context generation unit shown in FIG. 2;

FIG. 6 is a view for explaining a context generation sequence by a context generation unit shown in FIG. 5.

DESCRIPTION OF THE PREFERRED EMBODIMENTS

The present invention will be described in detail with reference to the accompanying drawings.

The definitions of terms and their relationships will be described.

Context: information representing the situation of a given object is defined as a context. Examples of the context are a profile (e.g., the position, age, and sex of a user), favor, room temperature, presence/absence, network bandwidth, and resolution of a personal computer.

Context Entity: An object which generates or utilizes a context is defined as a context entity. Examples of the context entity are a user, article, and environment. An application which only receives and utilizes a context is also defined as a context entity. A given context entity is distinguished from another context entity by a context entity identifier.

Material Context: A raw context obtained from a sensor is defined particularly as a material context.

Context Source: A source for generating a material context or externally providing a context is defined as a context source. A sensor is an example of the context source. A database capable of collecting contexts and externally providing them is another example of the context source. A given context source is distinguished from another context source by a context source identifier. Each context source necessarily has a context entity serving as a parent. Any context obtained from a context source serves as the context of a parent context entity.

Context Information: Information expressing a context in a format interpretable by a recipient is defined as context information. Information describing a context by XML (eXtensible Markup Language) in the PIDF (Presence Information Data Format) is an example of context information.

Each context necessarily has one context entity. For example, a user is a context entity for a user's position. An engine is a context entity for an engine temperature. A personal computer is a context entity for the screen resolution of the personal computer. A situation in which a given RFID tag is detected by a given RFID reader at given time is an example of the context. At this time, the detection itself is a material context, the RFID reader is a context source, and the RFID tag is a context entity identifier. The context source identifier of the reader, context entity identifier of the RFID tag, and information expressing the detection time in a specific format are pieces of context information. Note that the identifier of the RFID itself is generally used as the context entity identifier of the RFID.

First Embodiment

Figure 1:
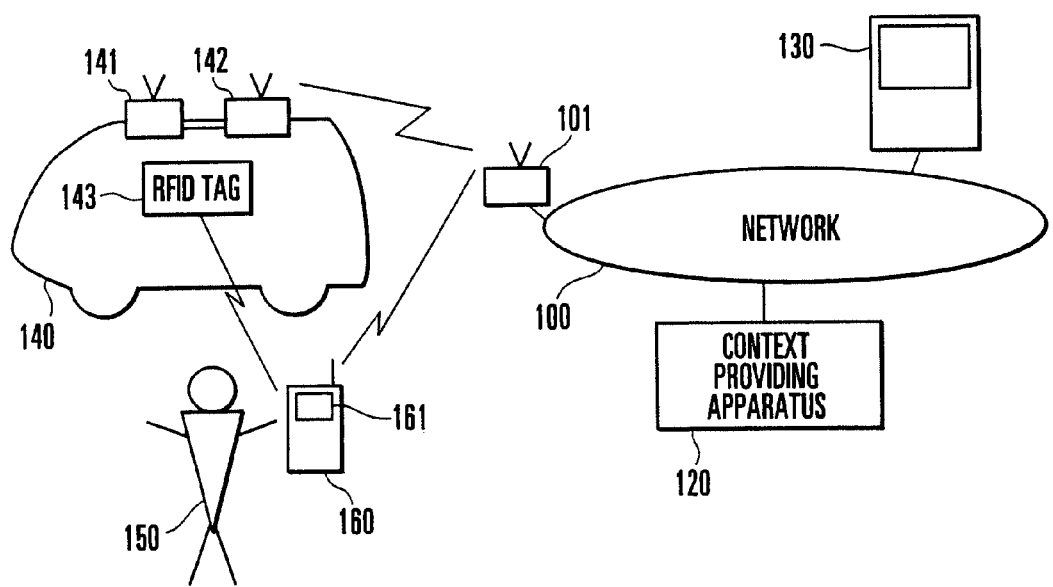
FIG. 1 is a schematic view showing a context providing system according to the first embodiment of the present invention.

A context providing system according to the first embodiment of the present invention will be described with reference to FIGS. 1 and 2. As shown in FIG. 1, the context providing system comprises a network 100, a base station 101, context providing apparatus 120, and context user terminal 130 which are connected to the network 100, an automobile 140 which can communicate with the base station 101 by radio, and a cellular phone 160 which communicates with the base station 101 by radio.

The automobile 140 comprises a GPS position detection device 141 which detects a position by GPS, a communication device 142 which communicates with the base station 101 by radio, and an RFID tag 143. The communication device 142 notifies, via the base station 101 and network 100, the context providing apparatus 120 of the position detected by the GPS position detection device 141. The cellular phone 160 comprises an RFID tag reader 161.

The context user terminal 130 serves as a terminal device which utilizes a context. In this case, the context user terminal 130 simply designates a specific context from a given object entity to send a context request to the context providing apparatus 120. The context user terminal 130 displays the context information received from the context providing apparatus 120. Note that the context user terminal 130 can be an agent or server or may be a device which processes context information.

The automobile 140, RFID tag 143, user 150, and cellular phone 160 serve as context entities, respectively. The GPS position detection device 141 and the RFID tag reader 161 mounted in the cellular phone 160 serve as context sources, respectively. Each context source necessarily has one parent context entity. The contexts collected by the context source are dealt as the contexts of the parent context entity. In this embodiment, the parent context entity of the GPS position detection device 141 serving as a context source is the automobile 140. The position information detected by the GPS position detection device 141 directly serves as the context information of the automobile 140. Similarly, the parent context entity of the RFID tag reader 161 serving as the context source is the cellular phone 160. The information of the RFID tag 143 which is detected by the RFID tag reader 161 is the context information of the cellular phone 160.

Figure 2:
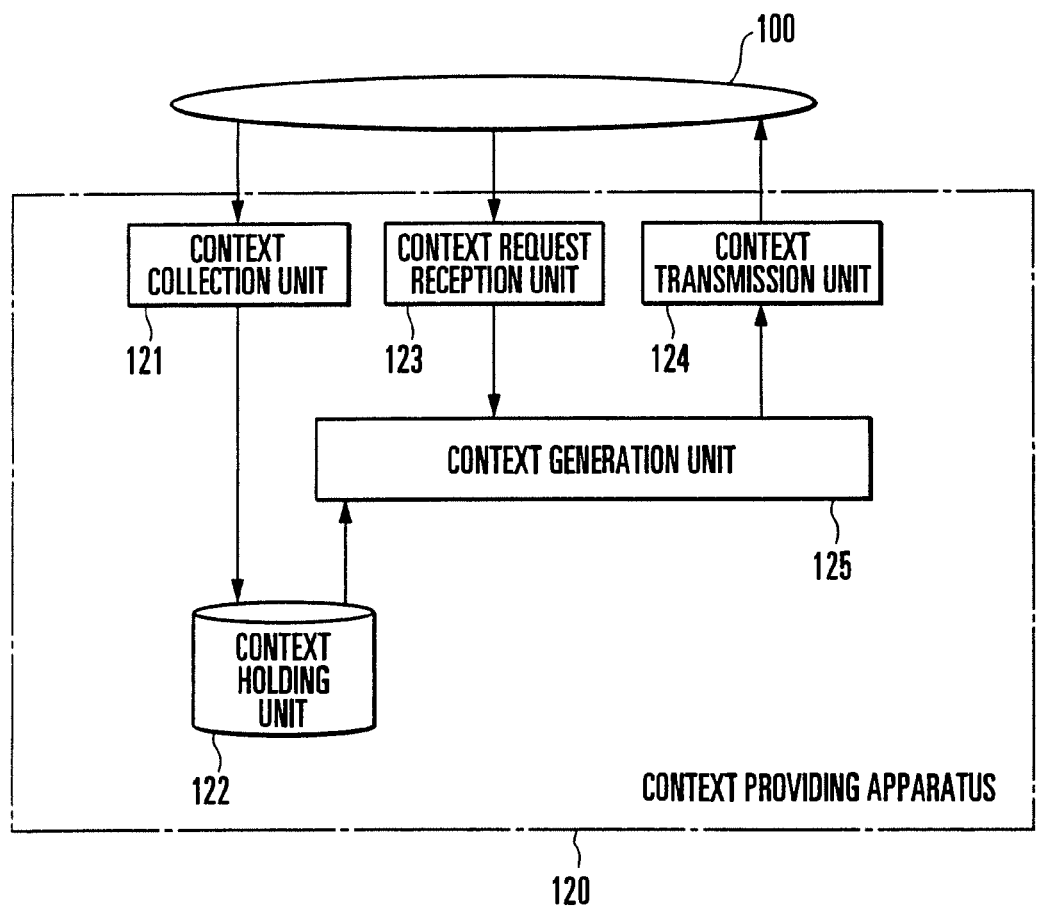
FIG. 2 is a block diagram of a context providing apparatus shown in FIG. 1.

As shown in FIG. 2, the context providing apparatus 120 comprises a context collection unit 121, context request reception unit 123, and context transmission unit 124 which are connected to the network 100, a context holding unit 122 connected to the context collection unit 121, and a context generation unit 125 connected to the context holding unit 122, context request reception unit 123, and context transmission unit 124.

Figure 3:
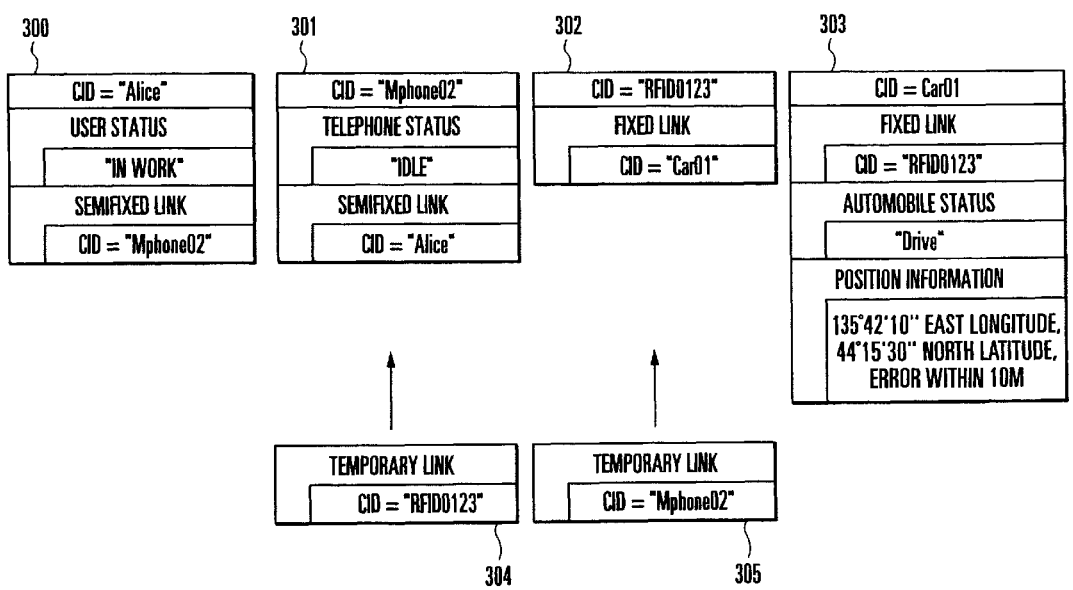
FIG. 3 is a view showing the structure of context information.

The context information of the context entity is recorded on the context holding unit 122 of the context providing apparatus 120, as shown in FIG. 3. In this embodiment, context information of the user 150 (to be referred to as user context information) 300 contains "Alice" representing the context entity identifier of the user 150, "In Work" representing the status of the user 150, and "Mphone02" representing the context entity identifier of the carried context entity as a semifixed link with the user 150.

Context information of the cellular phone 160 (to be referred to as cellular phone context information) 301 contains "idle" representing the status of the cellular phone 160 and "Alice" representing the context entity identifier of the user 150 which serves as a semifixed link.

Context information (to be referred to as RFID context information) 302 of the RFID tag 143 serving as the contact entity contains "RFID0123" representing the context entity identifier of the RFID tag 143 and "Car01" representing the context entity identifier of the automobile 140 which serves as a fixed link.

Context information (to be referred to as automobile context information) 303 of the automobile 140 serving as the context entity contains "car01" representing the context entity identifier of the automobile 140, "RFID0123" representing the context entity identifier of the RFID tag 143 serving as the fixed link destination, "Drive" representing the status of the automobile 140, and "135°42'10" east longitude, 44°15'30" north latitude, error within 10 m" representing the position information detected by the GPS position detection device 141.

Note that since the status of the user 150, the telephone status of the cellular phone 160, and the status of the automobile 140 can be generated by a general technique, a method of generating them will not be described.

FIG. 4 shows a program example by a pseudo-language representing the generation of the context generation unit 125. FIG. 4 shows a sequence (rule) for obtaining specific context information (target context information) of a specific context entity (target context entity).

In this sequence, it is checked if the target context information is present in the context information of the target context entity. If so, the target context information is output. If the target context information is not present, the above process is recursively executed for context information of another context entity linked by the context information of the target context entity until a desired result is obtained. In an actual implementation, the relationship between the context entities may be looped. For this reason, a mechanism for eliminating this loop is required. Assume that no loop is present in FIG. 4.

The operation of the context providing system having the above arrangement will now be described. This operation is performed such that a program prestored on a recording medium (not shown) is read and executed by a CPU (Central Processing Unit: not shown).

The user 150 gets in the automobile 140. The RFID tag reader 161 mounted in the cellular phone 160 carried by the user 150 detects the RFID tag 143 mounted in the automobile 140. The cellular phone 160 notifies the context providing apparatus 120 of context information made up of a pair of the cellular phone 160 and RFID tag 143 via the base station 101 and network 100. The context collection unit 121 in the context providing apparatus 120 receives the context information from the cellular phone 160 and adds cellar phone-RFID tag information as a temporary link to the cellular phone context information 301, as shown in FIG. 3. The context collection unit 121 also adds RFID tag-cellular phone information 305 as a temporary link to the RFID tag context information 302.

The context user terminal 130 requests the position context information of the user 150 to the context providing apparatus 120. The context request reception unit 123 in the context providing apparatus 120 receives the request from the context user terminal 130 and starts the context generation unit 125. A case wherein the context information of the context entity identified as "Alice" is requested will be exemplified.

The context generation unit 125 starts determining the position information of the user 150 serving as the context entity in response to the request from the context user terminal 130. The context generation unit 125 searches the context holding unit 122 for the context entity identified by "Alice". As a result of search, the context generation unit 125 extracts the user context information 300 containing the context entity identifier as "Alice".

The context-generation unit 125 checks if the context information of the position information is present in the user context information 300. Since the user context information 300 does not contain the context information whose type is position information, the context generation unit 125 searches for another context entity associated with the user 150. In this case, the context entity identifier "Mphone02" of the cellular phone 160 as a semifixed link is recorded. The context generation unit 125 then searches for context information having "Mphone02" as the context entity identifier and extracts the cellular phone context information 301.

No position information is present in the cellular phone context information 301. The RFID tag context information 302 is extracted using the context entity identifier "RFID0123" of the cellular phone-RFID tag information 304 recorded as a temporary link. No position information is present in the RFID tag context information 302, either. The automobile context information 303 having the context entity identifier "Car01" as a fixed link is extracted. Since position information is contained in the automobile context information 303, the context generation unit 125 determines the position information contained in the automobile context information 303 as the position information of "Alice".

The context providing apparatus 120 sends back, to the context user terminal 130 as the context of the user 150, the position information context originally serving as the position information of the automobile 140 and determined in the above step.

According to this embodiment, when position information of the user 150 cannot be obtained from only the context of the user 150, the context entities associated with the user 150 are sequentially traced, and the position information of the found context entity is provided to the request terminal as the context information of the user 150.

In this embodiment, a single network is used as the network 100, and the base station 101 is shared in communication with the communication device 142 and cellular phone 160. However, the present invention is not limited to this. A plurality of networks such as a cellular phone network, wireless LAN network, and the Internet or a plurality of base stations may be used.

In this embodiment, all pieces of context information are held in the context holding unit 122. However, the context holding means may be divided into a plurality of parts depending on the characteristics of information, such as permanent or temporary information. For example, the attributes representing the features of context entities and context sources, and the fixed relationships between the context entities may be held in another holding means.

Second Embodiment

Figure 5:
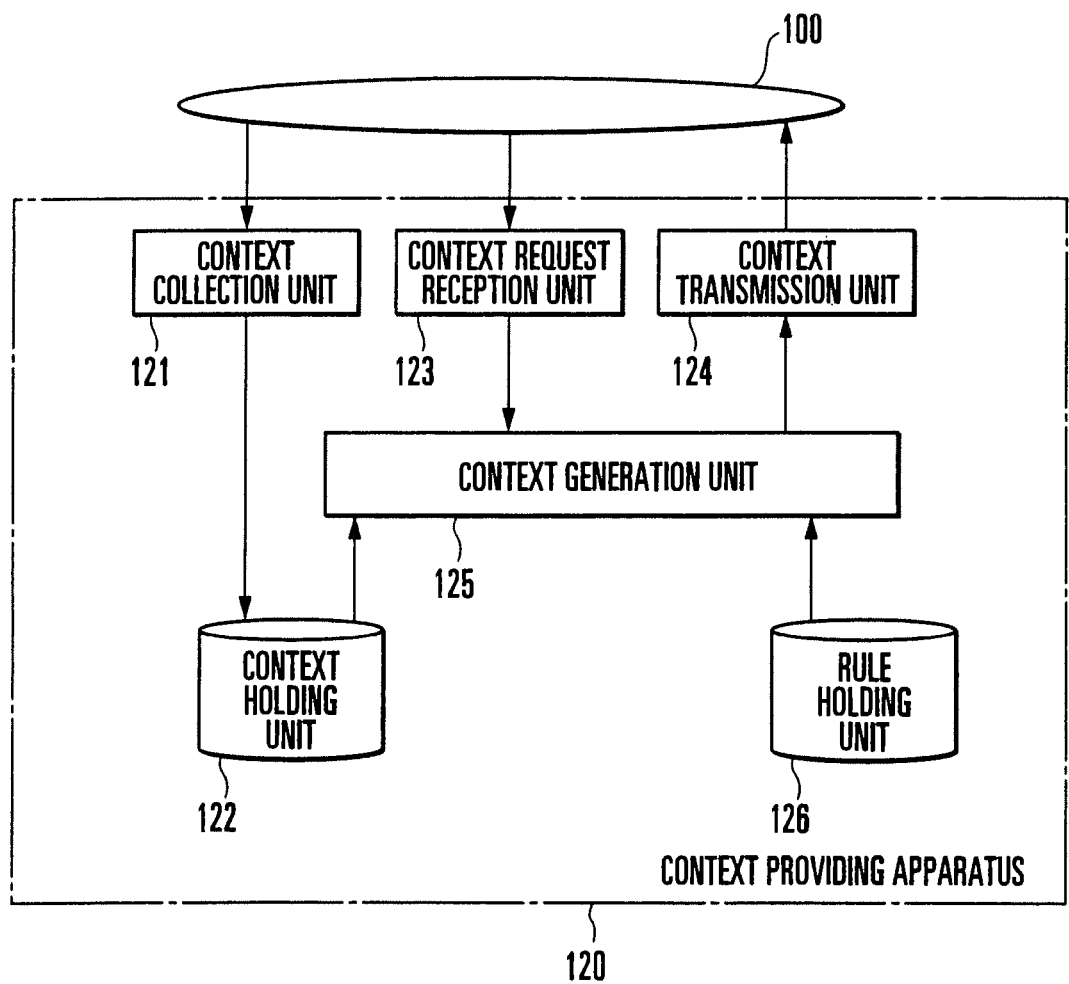
FIG. 5 is a schematic diagram showing a context providing system according to the second embodiment of the present invention.

A context providing system according to the second embodiment of the present invention will be described with reference to FIG. 5. The overall arrangement of the second embodiment is the same as in FIG. 1. The arrangement of a context providing apparatus 120 is shown in FIG. 4. In FIG. 4, a rule holding unit 126 which holds rules used for context generation is added to the arrangement in FIG. 2.

In the second embodiment, a context generation unit 125 does not hold a sequence for generating a context, but generates a context by interpreting a rule held in the rule holding unit 126. If a rule 400 shown in FIG. 4 is held in the rule holding unit 126, the same operation as in the first embodiment is performed.

When a rule 401 shown in FIG. 6 is employed as a position acquisition rule, more flexible position information acquisition is achieved. More specifically, in the rule 400 shown in FIG. 4, processing is ended when necessary context information is extracted for the first time. In the rule 401 in FIG. 6, however, all pieces of position information of all associated context entities are collected, and among them all, position information having a smallest error is selected as the position information of a target context entity.

For example, when a cellular phone 160 has a position detection means whose precision is poorer than that of a GPS position detection device 141, and a user 150 does not get in an automobile 140, the position information detected by the cellular phone 160 serves as the position information of the user 150. On the other hand, when the user 150 gets in the automobile 140, position information detected by a higher-precision GPS position detection device 141 serves as the position information of the user 150.

According to this embodiment, a flexible system can be constructed by adding or changing a rule.

As has been described above, according to the present invention, by utilizing the relationship between context entities, necessary context information is generated using context information obtained from a context source not directly related to a target context entity whose context should be grasped. An opportunity for utilizing generated context information can be enhanced.

What is claimed is:
1. A context providing method comprising:
  recording, in a context holding unit, a plurality of context information, wherein each context information includes a context entity identifier for distinguishing a context entity from other context entities, various information representing a state of the context entity, and association information;
  receiving a request for information representing the state of a first context entity;
  using a context generation unit, in response to the received request, from said context holding unit,
  extracting the context information of the first context entity,
  extracting the context information of a second context entity which is registered as the association information in the context information of the first context entity, and executing, at least once, a process of extracting the context information of a third context entity which is registered as the association information in the extracted context information excluding the context information of the first context entity, but not registered as the association information in the context information of the first context entity, to determine, as the information representing the state of the first context entity, the information contained in any of the extracted context information; and sending back the information determined by said context generation unit to respond to the request.

2. The context providing method according to claim 1, wherein when the context information of the first and second context entities do not contain the same kind of information as the requested information, further comprising:

extracting the context information of the second and third context information to determine, as the information representing the state of the first context entity, the information contained in the third context information.

3. The context providing method according to claim 1, further comprising:

determining, as the information representing the state of the first context entity, the information having the least error among the information contained in the first through the third context information.

4. The context providing method according to claim 1, further comprising:

collecting context information via a network, and, when information containing a first context entity identifier and a second context entity identifier has been collected, adding one of the context entity identifiers, as the association information, to the context information containing the other context entity identifier.

5. The context providing method according to claim 1, further comprising:

setting a predetermined rule; and determining the information representing the state of the first context entity in accordance with the predetermined rule.

6. A context providing system comprising: a radio communication system connected to a network; and a context providing apparatus comprising: a context holding unit comprising a memory device, the context holding unit configured to record a plurality of context information, wherein each context information includes a context entity identifier for distinguishing a context entity from other context entities, various information representing a state of the context entity, and association information; a context request reception unit configured to receive a request for information representing the state of a first context entity; a context generation unit configured to, in response to the request received by said context request reception unit, from said context holding unit, extract the context information of the first context entity, extract the context information of a second context entity which is registered as the association information in the context information of the first context entity, and execute, at least once, a process of extracting the context information of a third context entity which is registered as the association information in the extracted context information excluding the context information of the first context entity, but not registered as the association information in the context information of the first context entity, to determine, as the information representing the state of the first context entity, the information contained in any of the extracted context information; and a context transmission unit configured to send back the information determined by said context generation unit to respond to the request.

7. The context providing system according to claim 6, wherein when the context information of the first and second context entities do not contain the same kind of information as the requested information, said context generation unit is further configured to extract the context information of the second and third context information to determine, as the information representing the state of the first context entity the information contained in the third context information.

8. The context providing system according to claim 6, wherein said context generation unit is further configured to determine, as the information representing the state of the first context entity, the information having the least error among the information contained in the first through the third context information.

9. The context providing system according to claim 6, further comprising a context collection unit configured to collect context information via a network, and, when information containing a first context entity identifier and a second context entity identifier has been collected, add one of the context entity identifiers, as the association information, to the context information containing the other context entity identifier.

10. The context providing system according to claim 6, further comprising a rule holding unit that holds a predetermined rule, wherein said context generations unit is further configured to determine the information representing the state of the first context entity in accordance with the rule held in said rule holding unit.

11. A context providing apparatus comprising: a context holding unit comprising a memory device, the context holding unit configured to record a plurality of context information, wherein each context information includes a context entity identifier for distinguishing a context entity from other context entities, various information representing a state of the context entity, and association information; a context request reception unit configured to receive a request for information representing the state of a first context entity; a context generation unit configured to, in response to the request received by said context request reception unit, from said context holding unit, extract the context information of the first context entity, extract the context information of a second context entity which is registered as the association information in the context information of the first context entity, and execute, at least once, a process of extracting the context information of a third context entity which is registered as the association information in the extracted context information excluding the context information of the first context entity, but not registered as the association information in the context information of the first context entity, to determine, as the information representing the state of the first context entity, the information contained in any of the extracted context information; and a context transmission unit configured to send back the information determined by said context generation unit to respond to the request.

12. The context providing apparatus according to claim 11, wherein when the context information of the first and second context entities do not contain the same kind of information as the requested information, said context generation unit is further configured to extract the context information of the second and third context information to determine, as the information representing the state of the first context entity, the information contained in the third context information.

13. The context providing apparatus according to claim 11, wherein said context generation unit is further configured to determine, as the information representing the state of the first context entity, the information having the least error among the information contained in the first through the third context information.

14. The context providing apparatus according to claim 11, further comprising a context collection unit configured to collect context information via a network, and, when information containing a first context entity identifier and a second context entity identifier has been collected, add one of the context entity identifiers, as the association information, to the context information containing the other context entity identifier.

15. The context providing apparatus according to claim 11, further comprising a rule holding unit that holds a predetermined rule,
   wherein said context generation unit is further configured to determine the information representing the state of the first context entity in accordance with the rule held in said rule holding unit.

16. A non-transitory computer-readable medium having computer-readable instructions stored thereon that, upon execution by a processor, cause the processor to:
   record, in a context holding unit, a plurality of context information, wherein each context information includes a context entity identifier for distinguishing a context entity from other context entities, various information representing a state of the context entity, and association information;
   receive a request for information representing the state of a first context entity;
   instruct a context generation unit to, in response to the received request, from said context holding unit,
      extract the context information of the first context entity,
      extract the context information of a second context entity which is registered as the association information in the context information of the first context entity, and
      execute, at least once, a process of extracting the context information of a third context entity which is registered as the association information in the extracted context information excluding the context information of the first context entity, but not registered as the association information in the context information of the first context entity, to determine, as the information representing the state of the first context entity, the information contained in any of the extracted context information; and
   send back the information determined by said generation context unit to respond to the request.

17. The non-transitory computer-readable medium according to claim 16, wherein when the context information of the first and second context entities do not contain the same kind of information as the requested information, further comprising instructions to
   extract the context information of the second and third context information to determine, as the information representing the state of the first context entity, the information contained in the third context information.

18. The non-transitory computer-readable medium according to claim 16, further comprising instructions to
   determine, as the information representing the state of the first context entity, the information having the least error among the information contained in the first through the third context information.

19. The non-transitory computer-readable medium according to claim 16, further comprising instructions to
   collect context information via a network, and, when information containing a first context entity identifier and a second context entity identifier has been collected, add one of the context entity identifiers, as the association information, to the context information containing the other context entity identifier.

20. The non-transitory computer-readable medium according to claim 16, further comprising instructions to:
   establish a predetermined rule; and
   determine the information representing the state of the first context entity in accordance with the predetermined rule.

* * * * *